US009302926B2

(12) United States Patent
Ando et al.

(10) Patent No.: US 9,302,926 B2
(45) Date of Patent: Apr. 5, 2016

(54) PROCESS FOR PRODUCING GRANULES, METHOD FOR PRODUCING MOLTEN GLASS AND METHOD FOR PRODUCING GLASS PRODUCT

(71) Applicant: ASAHI GLASS COMPANY, LIMITED, Chiyoda-ku (JP)

(72) Inventors: Ryota Ando, Tokyo (JP); Yasuo Hayashi, Tokyo (JP)

(73) Assignee: Asahi Glass Company, Limited, Chiyoda-ku (JP)

( * ) Notice: Subject to any disclaimer, the term of this patent is extended or adjusted under 35 U.S.C. 154(b) by 186 days.

(21) Appl. No.: 14/088,851

(22) Filed: Nov. 25, 2013

(65) Prior Publication Data

US 2014/0075995 A1 Mar. 20, 2014

Related U.S. Application Data

(63) Continuation of application No. PCT/JP2012/063365, filed on May 24, 2012.

(30) Foreign Application Priority Data

May 25, 2011 (JP) .................................. 2011-117148

(51) Int. Cl.
*C03B 5/16* (2006.01)
*B01D 53/14* (2006.01)
(Continued)

(52) U.S. Cl.
CPC .............. *C03B 5/16* (2013.01); *B01D 53/1418* (2013.01); *C03B 1/02* (2013.01); *C03B 5/237* (2013.01); *C03B 19/102* (2013.01); *C03B 19/1055* (2013.01); *C03C 1/002* (2013.01); *C03C 3/089* (2013.01); *Y02P 40/535* (2015.11)

(58) Field of Classification Search
None
See application file for complete search history.

(56) References Cited

U.S. PATENT DOCUMENTS

| | | | |
|---|---|---|---|
| 2010/0077691 A1* | 4/2010 | Constantz et al. .............. | 52/596 |
| 2012/0144863 A1 | 6/2012 | Shinohara et al. | |
| 2013/0247617 A1 | 9/2013 | Shinohara | |

FOREIGN PATENT DOCUMENTS

| | | |
|---|---|---|
| CN | 101888980 A * | 11/2010 |
| JP | 62-171731 | 7/1987 |

(Continued)

OTHER PUBLICATIONS

CN101888980A English Translation—Google Patents Jul. 23, 2015.*

(Continued)

*Primary Examiner* — Lisa Herring
(74) *Attorney, Agent, or Firm* — Oblon, McClelland, Maier & Neustadt, L.L.P.

(57) ABSTRACT

To provide a process for producing granules, wherein a component in an exhaust gas discharged from a glass melting furnace can be reused as a raw material for alkali-free glass, and a heating and drying step is not required for the reuse. Exhaust gas G1 formed in a process for melting a raw material of glass containing a boron component is brought in contact with contacting liquids L1 and L2 to obtain treated liquids S1, S2 and S3 having the boron component in the exhaust gas G1 dissolved therein; magnesium hydroxide is added to the mixture of the treated liquids in a treated liquid tank 14 to obtain a liquid containing a boron component and a magnesium component; by using the liquid, a granulation liquid is prepared; and in the presence of the granulation liquid, a raw material mixture for producing alkali-free borosilicate glass is granulated to produce granules.

15 Claims, 2 Drawing Sheets

(51) Int. Cl.
*C03C 3/089* (2006.01)
*C03C 1/00* (2006.01)
*C03B 1/02* (2006.01)
*C03B 5/237* (2006.01)
*C03B 19/10* (2006.01)

(56) References Cited

FOREIGN PATENT DOCUMENTS

| | | |
|---|---|---|
| JP | 2003-305331 | 10/2003 |
| JP | 2004-238236 | 4/2004 |
| JP | 2004-238236 | 8/2004 |
| JP | 2009/072612 | 6/2009 |
| JP | 2009-137780 | 6/2009 |
| WO | 2009/072612 | 6/2009 |

OTHER PUBLICATIONS

International Search Report issued Aug. 28, 2012 in PCT/JP2012/063365 filed May 24, 2012.

\* cited by examiner

PROCESS FOR PRODUCING GRANULES, METHOD FOR PRODUCING MOLTEN GLASS AND METHOD FOR PRODUCING GLASS PRODUCT

TECHNICAL FIELD

The present invention relates to a process for producing granules, a method for producing molten glass by using the granules obtained by the process for producing granules, and a method for producing a glass product by using the method for producing molten glass.

BACKGROUND ART

In an exhaust gas discharged from a glass melting furnace, various components derived from a glass raw material are usually contained. For example, in a case where borosilicate glass is produced, in the exhaust gas, a boron component containing boron (B) is contained. Further, in many cases, a sulfur component containing sulfur (S) is contained. If these components are discharged to the atmosphere as they are, they are likely to present adverse influences to the environment. Therefore, various methods are being studied to remove these components from the exhaust gas.

As a method for removing a boron component and a sulfur component from an exhaust gas, Patent Document 1 discloses a method wherein a boron component and a sulfur component in an exhaust gas are removed as dissolved in water by bringing cooling water and contacting water in contact with the exhaust gas. It is so designed that a waste liquid containing the boron component and the sulfur component, formed by this method, can be reused as cooling water or contacting water after being neutralized.

In Examples in Patent Document 1, NaOH is used as a neutralizing agent, whereby no precipitate will be formed by the neutralization, and the waste liquid after the neutralization may be reused as it is, as a part of cooling water or contacting water. Further, since the boron component, etc. contained in the exhaust gas are useful as glass raw materials, it is also being studied to recover them and reuse them as glass raw materials.

Patent Document 2 discloses a method wherein as a fuel at the time of heating and melting a glass raw material, a fuel containing substantially no sulfur component is used; an exhaust gas from the glass melting furnace is contacted with water to obtain a collected liquid; the collected liquid is neutralized to obtain a neutralized collected liquid; and the neutralized collected liquid is subjected to solid-liquid separation, followed by heating and drying, to recover an arsenic component, a boron component and a chlorine component which are useful as glass raw materials.

PRIOR ART DOCUMENTS

Patent Documents

Patent Document 1: WO2009/072612
Patent Document 2: JP-A-2004-238236

DISCLOSURE OF INVENTION

Technical Problem

In various display glass substrates, etc., alkali-free glass containing substantially no alkali metal oxides is used.

Like in the method disclosed in Patent Document 1, if NaOH is used as a neutralizing agent for a waste liquid, a sodium salt as an alkali metal salt will be contained in the waste liquid after the neutralization. In the waste liquid after the neutralization, although a boron component and a sulfur component which can be reused as glass raw materials are contained, an alkali metal salt is also contained, and therefore, such a waste liquid cannot be used for the production of alkali-free glass.

In the method disclosed in Patent Document 2, a calcium compound such as slaked lime or quicklime is used as a neutralizing agent for the collected liquid to form an insoluble calcium salt such as calcium borate. Therefore, in order to reuse such calcium borate as a part of glass raw materials, a solid-liquid separation step and a heating and drying step will be required, thus leading to an increase of the production costs.

It is an object of the present invention to provide a process for producing granules, wherein a component in an exhaust gas discharged from a glass melting furnace can be reused as a raw material for alkali-free glass, and a heating and drying step is not required for the reuse, a method for producing molten glass by using the granules obtained by the process for producing granules, and a method for producing a glass product by using the method for producing molten glass.

Solution to Problem

By paying attention to the fact that many alkali-free borosilicate glass materials useful as display substrate glass materials contain MgO as a glass component, the present inventors have studied to use a magnesium solution as a neutralizing agent for a waste liquid. For example, magnesium hydroxide is inexpensive and easy to handle and thus is used as a neutralizing agent for a usual acidic waste liquid, but it has a low solubility in water and is usually in a slurry state, and therefore, in a case where the liquid is to be reused by recycling, there is fear that it may bring about clogging of a pipe line. The present inventors have found that when a magnesium hydroxide slurry is added to a waste liquid containing a boron component, an aqueous solution is obtainable in spite of the fact that magnesium is contained, whereby utilization of the boron component is facilitated, such being useful for the production of glass raw material granules, and thus have arrived at the present invention.

The present invention provides the following [1] to [15].
[1] A process for producing granules, which comprises:
an exhaust gas treating step of contacting a contacting liquid and an exhaust gas formed in a process for producing borosilicate glass by melting a glass raw material, to obtain a treated liquid having a boron component in the exhaust gas dissolved in the contacting liquid,
a magnesium hydroxide-addition step of adding magnesium hydroxide to the treated liquid to obtain a liquid containing the boron component and the magnesium component,
a granulation liquid-preparation step of preparing a granulation liquid by using the liquid containing the boron component and the magnesium component, and
a granulation step of granulating a glass raw material powder for producing alkali-free borosilicate glass in the presence of the granulation liquid.
[2] The process for producing granules according to [1], wherein the borosilicate glass is alkali-free borosilicate glass.
[3] The process for producing granules according to [1] or [2], wherein the alkali-free borosilicate contains at least $SiO_2$, $B_2O_3$ and MgO, and as represented by mol % based on oxides, the content of $SiO_2$ is from 60 to 75 mol %, the content of $B_2O_3$ is from 2 to 25 mol %, and the content of MgO is from 1 to 30 mol %.

[4] The process for producing granules according to [1] or [2], wherein the granules are produced by adjusting the glass raw material powder and the granulation liquid so that glass obtainable by melting and vitrifying the granules would be alkali-free borosilicate glass having the glass composition as defined in [3].

[5] The process for producing granules according to any one of [1] to [4], wherein a part of the liquid containing the boron component and the magnesium component is reused as the contacting liquid.

[6] The process for producing granules according to any one of [1] to [5], wherein in the magnesium hydroxide-addition step, the magnesium hydroxide is added so that the pH of the liquid containing the boron component and the magnesium component would be within a range of from 6.5 to 7.7.

[7] The process for producing granules according to any one of [1] to [6], wherein in the magnesium hydroxide-addition step, the liquid containing the boron component and the magnesium component is further stirred.

[8] The process for producing granules according to any one of [1] to [7], wherein before contacting the exhaust gas with the contacting liquid, the exhaust gas is treated by a dust collector.

[9] The process for producing granules according to [8], wherein before the dust collector, calcium hydroxide is supplied to the exhaust gas.

[10] A method for producing molten glass, which comprises melting the granules obtained by the process as defined in any one of [1] to [9], to obtain molten glass.

[11] The method for producing molten glass according to [10], wherein an exhaust gas formed by melting of the granules is used as the above exhaust gas.

[12] The method for producing molten glass according to [10] or [11], wherein the granules are put onto a molten glass liquid surface in the melting furnace and melted.

[13] The method for producing molten glass according to [10] or [11], wherein at least a part of the granules is melted in a gas phase atmosphere to form molten glass particles, and the molten glass particles are collected to obtain molten glass.

[14] A method for producing a glass product, which comprises forming the molten glass obtained in the method for producing molten glass as defined in any one of [10] to [13], followed by annealing.

[15] The method for producing a glass product according to [14], wherein the molten glass is formed into a plate-form by a float process.

Advantageous Effects of Invention

According to the process for producing granules of the present invention, a boron component in an exhaust gas discharged from a glass melting furnace can be recovered in such a state as dissolved in a liquid containing no alkali metal ions. Such a liquid is in the form of an aqueous solution containing the boron component and a magnesium component, and the boron component and the magnesium component in the aqueous solution will serve as a boron source and a magnesium source of molten glass. By using such a liquid as a granulation liquid or as a part thereof, it is possible to reuse the boron component in an exhaust gas discharged from a glass melting furnace, as a raw material for alkali-free borosilicate glass.

Thus, by the process for producing granules of the present invention and by producing a glass product by a method for producing molten glass using the granules, it is possible to reduce the amount of raw material to be used and to reduce the production costs. Further, such a method is applicable also to the production of a glass product made of alkali-free borosilicate glass containing substantially no alkali metal oxides.

DESCRIPTION OF EMBODIMENTS

<Glass Composition>

A glass product to be produced by the present invention is alkali-free borosilicate glass (hereinafter sometimes referred to simply as borosilicate glass or glass). The glass composition in the glass product is preferably borosilicate glass which contains, as represented by mol % based on oxide, at least 1 mol % of MgO, wherein the content of alkali metal oxides is less than 1 mol % in total.

The components of the glass are represented by oxides such as $SiO_2$, $B_2O_3$, $Al_2O_3$, MgO, CaO, SrO, BaO, etc., and their contents are represented by mol % as calculated as oxides.

Further, in the present invention, alkaline earth metals are meant for three types of elements of calcium (Ca), strontium (Sr) and barium (Ba).

The composition of solid glass (glass in a glass product) having molten glass in the present invention solidified is such that the content of $SiO_2$ is from 60 to 75 mol %, the content of $B_2O_3$ is from 2 to 25 mol %, and the content of MgO is from 1 to 30 mol %, and it preferably contains substantially no alkali metal oxides. Specifically, the total content of alkali metal oxides is preferably less than 1 mol %, more preferably less than 0.1 mol %. As other components, components known in alkali-free borosilicate glass may be contained.

[$SiO_2$]

$SiO_2$ is a network former of glass and an essential component. $SiO_2$ is highly effective e.g. to increase acid resistance of glass and to reduce the density of glass. Its content is usually at most 75 mol %, preferably at most 70 mol %, so that the viscosity of molten glass will not become too high, or it will not be difficult to produce molten glass by a usual melting method. On the other hand, if the content of $SiO_2$ is too small, the acid resistance tends to deteriorate and the linear expansion coefficient is likely to increase, and therefore, its content is preferably at least 60 mol % in the case of a display substrate glass.

[$B_2O_3$]

$B_2O_3$ is a network former of glass and is also a component to improve the melting reactivity in melting and vitrification. The content of $B_2O_3$ is usually at least 2 mol %, preferably at least 5 mol %.

On the other hand, $B_2O_3$ may sometimes lower the acid resistance of glass, and particularly in the case of a display substrate glass, the content of $B_2O_3$ is at most 25 mol %, preferably at most 20 mol %, more preferably at most 8 mol %.

[MgO]

MgO is a component to lower the viscosity of molten glass, and it lowers the density of glass and improves the melting reactivity without increasing the linear expansion coefficient. Therefore, it is an essential component particularly in a case where a float process is employed in a step of forming glass to produce a display glass substrate. In the present invention, the content of MgO is at least 1 mol %, preferably at least 2 mol %, more preferably at least 4 mol %. On the other hand, from the viewpoint of avoiding phase separation of glass, increasing the acid resistance, etc., its content is at most 30 mol %, preferably at most 20 mol %, more preferably at most 15 mol %, further preferably at most 10 mol %.

[Other Glass Components]

Examples of other glass components which may be contained, may, for example, be $Al_2O_3$ and alkaline earth metal oxides (at least one member of SrO, CaO and BaO).

[$Al_2O_3$]

$Al_2O_3$ is a component which may be used for the purpose of e.g. increasing the strain point of glass and suppressing phase separation of glass. In a case where $Al_2O_3$ is contained, its content is preferably at least 1 mol %, more preferably at least 5 mol %, further preferably at least 10 mol %. On the other hand, in order to avoid a high increase of viscosity of molten glass or deterioration of devitrification properties or acid resistance, the content of $Al_2O_3$ is preferably at most 20 mol %, more preferably at most 15 mol %.

[CaO]

CaO is a component to lower the viscosity of molten glass and a component which may be used for the purpose of adjusting the glass properties such as the density, linear expansion coefficient, strain point, etc. In a case where CaO is contained, its content is preferably at least 1 mol %, more preferably at least 2 mol %, further preferably at least 4 mol %. On the other hand, from the viewpoint of avoiding a deterioration of the devitrification properties, an increase of the linear expansion coefficient, etc., its content is at most 20 mol %, preferably at most 15 mol %, more preferably at most 10 mol %.

[SrO]

SrO is a component to lower the viscosity of molten glass and is a component which may be contained in order to improve the devitrification properties and the acid resistance of glass. In a case where SrO is contained, its content is preferably at least 1 mol %, more preferably at least 2 mol %. Its content is at most 10 mol %, preferably at most 7 mol %, more preferably at most 6 mol %.

[BaO]

BaO is a component to lower the viscosity of molten glass and is a component which may be contained in order to avoid phase separation or to improve the devitrification properties and the acid resistance of glass. However, in a case where glass to e.g. increase the density is a liquid crystal glass substrate, it should better be within an unavoidable content. In a case where BaO is positively contained, its content is preferably at most 10 mol %, more preferably at most 5 mol %, further preferably at most 2 mol %.

If the total content of SrO, CaO and BaO is small, the viscosity of glass tends to be high, and the melting reactivity tends to deteriorate. Their total content is preferably at least 5 mol %, more preferably at least 8 mol %. On the other hand, from the viewpoint of avoiding an increase of the density or the linear expansion coefficient of glass, the total content of SrO, CaO and BaO is preferably at most 20 mol %, more preferably at most 18 mol %, further preferably at most 15 mol %.

[In the Case of Glass Wherein Alkaline Earth Metal Oxide is Contained]

According to a finding by the present inventors, in a case where an alkaline earth metal oxide is contained in glass, the strength of granules is improved when an alkaline earth metal borate hydrate is formed in the step of producing granules. Accordingly, particularly in a case where an alkaline earth metal oxide is contained in glass, the content of $B_2O_3$ is preferably at least 2 mol %, more preferably at least 5 mol %, from such a viewpoint that such an effect to improve the strength of granules is thereby readily obtainable.

In such a case, a preferred glass composition is such that the content of $SiO_2$ is from 60 to 75 mol %, the content of $Al_2O_3$ is from 0 to 15 mol %, the content of $B_2O_3$ is from 2 to 25 mol %, the content of MgO is from 1 to 20 mol %, and the total content of SrO, CaO and BaO is from 5 to 20 mol %.

<Method for Producing Molten Glass>

Figure 1:
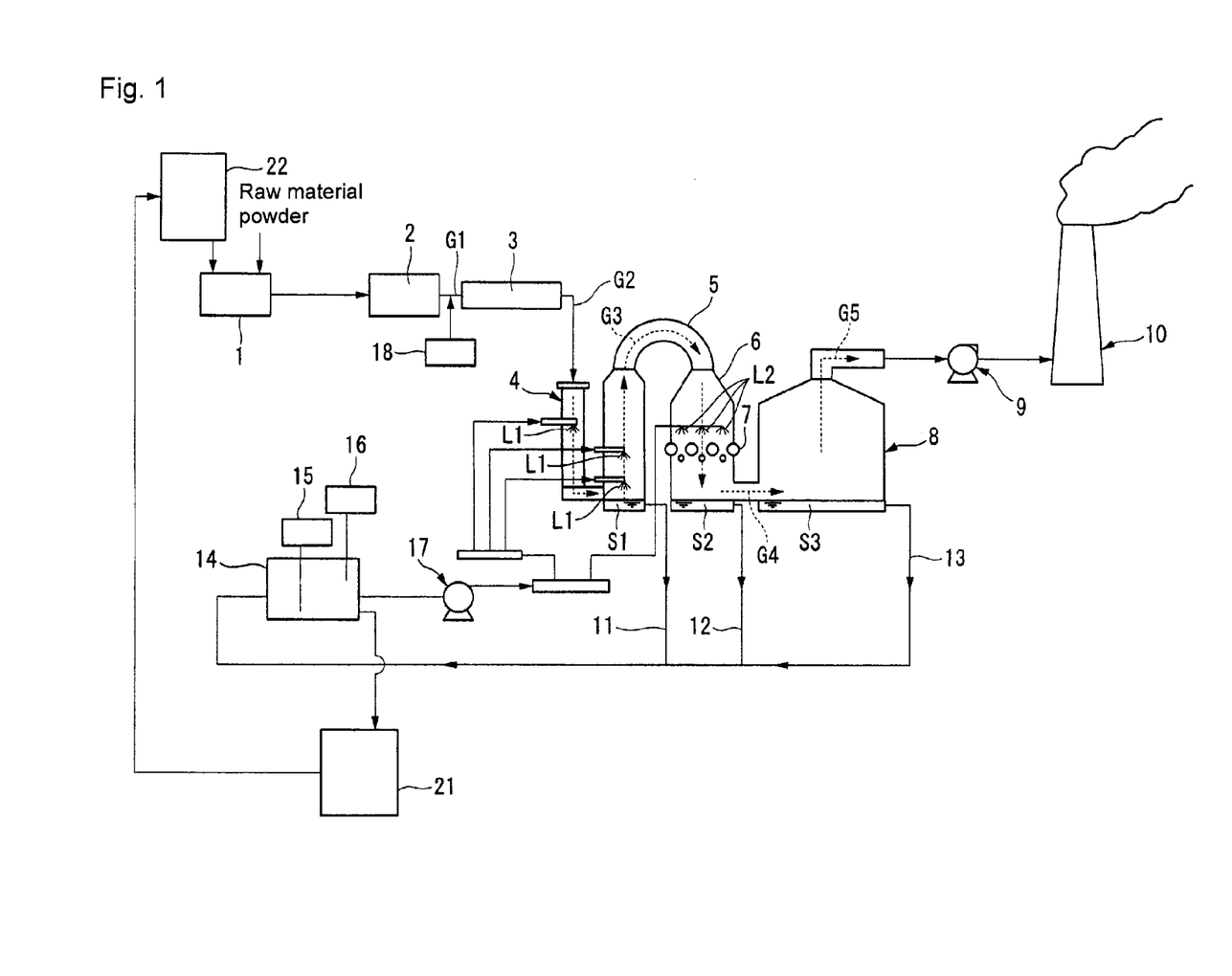
FIG. 1 is a schematic configuration diagram illustrating one embodiment of an apparatus to be suitably used for the method for producing molten glass of the present invention.

FIG. 1 is a schematic configuration diagram illustrating one embodiment of an apparatus to be suitably used for the method for producing molten glass of the present invention. The apparatus of this embodiment is roughly constituted by a granulation device 1, a melting furnace 2, a bag filter 3, a cooling tower 4, a scrubber (exhaust gas cleaning device) 6, a centrifugal dust collector 8, a chimney 10, a treated liquid tank 14, a magnesium hydroxide-addition device 16, a circulation pump 17 and a granulation liquid preparation vessel 21.

Now, the method for producing molten glass will be described with reference to the apparatus in FIG. 1, as one embodiment of the method for producing molten glass of the present invention.

<Melting of Granules>

In the method for producing molten glass of this embodiment, granules obtainable by granulating a glass raw material powder in the presence of a granulation liquid, are used. The step of producing granules (granulation step) will be described later.

Firstly, granules are put into a melting furnace 2, and they are melted to form molten glass (step of melting granules). The step of melting granules may be carried out by a usual melting method using a glass melting furnace of e.g. a Siemens type, or by an in-flight melting method. Either method can be carried out by a known method. In this embodiment, a usual melting method is employed.

[Usual Melting Method]

A usual melting method is a method wherein granules are supplied onto a liquid surface of molten glass already melted in a glass melting furnace, to form a gob (also called a batch pile) of granules, which is heated by e.g. a burner to let melting proceed from the surface of the gob to gradually form molten glass.

[In-flight Melting Method]

In an in-flight melting method, at least a part of granules is melted in a gas phase atmosphere to form molten glass particles, and the molten glass particles are collected to form molten glass.

Specifically, granules are firstly introduced into a high temperature gas phase atmosphere of an in-flight heating apparatus. As the in-flight heating apparatus, a known apparatus may be used. The granules produced by the present invention is excellent in strength, whereby even if collision of particles one another or particles to e.g. an inner wall of the transport path may occur during the transportation or introduction, formation of fine powder can be avoided.

Here, "at least a part of granules is melted" means that with respect to individual granules, a part or whole of each granule is melted. The state wherein a part of granules is melted, may, for example, be a state wherein the surface of each granule is melted and the center portion thereof is not sufficiently melted. In such a case, in each molten glass particle, the entire particle is not melted, and at the center, a portion not sufficiently melted, is present. However, even in a case where a portion not sufficiently melted is present, in a process where such particles are collected to form glass melt, they are heated, so that a uniform glass melt is obtainable at the time of supplying to a forming step.

In the in-flight melting method, it is preferred to melt individual granules in the gas phase atmosphere to form molten glass particles. Even if a part of granules may not sufficiently be melted in the gas phase atmosphere, the majority of granules should preferably be formed into molten glass particles in the gas phase atmosphere. Hereinafter, including particles not sufficiently melted in the gas phase atmosphere, particles formed in the gas phase atmosphere will be referred to as molten glass particles.

Granules are melted in the gas phase atmosphere to form molten glass particles, then, the formed molten glass particles are collected in the in-flight heating apparatus to obtain glass melt, and molten glass taken out from the glass melt will be supplied to the next forming step. The method for collecting the molten glass particles may, for example, be a method wherein the molten glass particles falling in the gas phase atmosphere by their own weight, are received and collected in a heat resistant container provided at a lower portion in the gas phase atmosphere.

<Exhaust Gas>

An exhaust gas formed in a process for melting a glass raw material in the present invention is exhaust gas G1 formed from a melting furnace 2 in FIG. 1. In the exhaust gas G1, gas components derived from constituting components of the glass raw material put into the melting furnace 2 are contained. In the present invention, as the glass raw material to form the exhaust gas G1 (i.e. the glass raw material to be melted in the melting furnace), granules may be used as in this embodiment, or a usual glass raw material powder may be used. Further, the glass raw material to be melted is basically preferably a raw material for alkali-free borosilicate glass, but it may have an alkali component so long as it contains a boron component. The reason is such that an alkali component such as sodium can be adsorbed by passing the exhaust gas G1 through a bag filter which will be described later, and therefore, an alkali component may be contained in the exhaust gas G1 discharged from the melting furnace. However, in the exhaust gas G1, a component should not be contained, which will not be a raw material for alkali-free borosilicate glass and which cannot be removed in a step prior to the after-mentioned magnesium hydroxide-addition step. If such a component is contained in the exhaust gas G1, granules containing such a component will be formed, and such granules may not be used as a raw material for alkali-free borosilicate glass. Accordingly, a glass raw material containing phosphoric acid, lead, etc. is not desirable as the glass raw material to be melted in the melting furnace 2.

It is preferred to use, as a glass raw material, granules obtained by the process for producing granules of the present invention and to use an exhaust gas obtained in the melting step, whereby an extra component to be removed is little, and the glass raw material can be recovered and reused in one melting furnace, such being highly efficient. Further, granules obtained by a boron component recovered from an exhaust gas from one melting furnace may be used for the production of alkali-free borosilicate glass in another melting furnace. In either case, it is possible to efficiently recover boron from the exhaust gas formed in the process for producing molten glass and to reuse it as a raw material for alkali-free borosilicate glass.

In this specification, "boron component" is a general term for a component containing a boron atom (B) (the same applies to another component). The boron component in the exhaust gas G1 is mainly boric acid or boron oxide.

The exhaust gas G1 may contain components derived from a clarifier, such as a component containing a sulfur atom (S) (which may be referred to as a sulfur component in this specification), a component containing a chlorine atom (Cl) (which may be referred to as a chlorine component in this specification), a component containing a fluorine atom (F) (which may be referred to as a fluorine component in this specification), etc. Further, in a case where a fuel containing sulfur, such as heavy oil, is burned in the melting furnace 2, a sulfur component derived from the fuel will be contained in the exhaust gas G1.

The sulfur component in the exhaust gas G1 is mainly an oxide ($SO_X$).

The chlorine component in the exhaust gas G1 is mainly HCl.

The fluorine component in the exhaust gas G1 is mainly HF.

In a case where a sulfur component and/or a chlorine component is contained in the exhaust gas discharged from the glass melting furnace, if such a component is dissolved in water and then reacted with magnesium hydroxide, a magnesium salt ($MgSO_4$ or $MgCl_2$) will be formed.

Accordingly, the process of the present invention is useful also in a case where a sulfur component and/or a chlorine component is contained in addition to a boron component in the exhaust gas G1, and such a component can be recovered as a magnesium salt and can be reused for the production of glass.

[Exhaust Gas Treating Step]

The exhaust gas G1 generated from the melting furnace 2 is supplied to a cooling tower 4 and contacted with a first contacting liquid L1 in the cooling tower, and then contacted with a second contacting liquid L2 in a scrubber 6.

In this embodiment, a bag filter (a dust collector) 3 is provided in a pathway for the exhaust gas G1 to the cooling tower 4, and the exhaust gas G1 is treated by the bag filter (the dust collector) 3 before it is contacted with the contacting liquid L1. In the FIG., reference symbol G2 represents the exhaust gas immediately before being supplied to the cooling tower 4.

As the bag filter 3, a known one may suitably be used. By providing the bag filter 3, solids in the exhaust gas G1 can be removed. Further, as mentioned above, in a case where an alkali component is present in the exhaust gas G1, such an alkali component is removed.

In a case where a fluorine component is contained in the exhaust gas G1, it is preferred that in a pathway from the melting furnace 2 to the bag filter 3, powdery calcium hydroxide (slaked lime) is supplied into the exhaust gas G1 to remove the fluorine component from the exhaust gas G1. In the FIG., reference symbol 18 represents a calcium hydroxide supplying means. The powdery calcium hydroxide adsorbs the fluorine component in the exhaust gas G1 and then is removed by the gag filter 3. Thus, by preliminarily removing the fluorine component in the exhaust gas G1, it is possible to avoid formation of a water-insoluble magnesium salt ($MgF_2$) by a reaction of the fluorine component and magnesium hydroxide in the after-mentioned magnesium hydroxide-addition step.

The temperature of the exhaust gas G2 immediately before being supplied to the cooling tower 4 is not particularly limited, and, for example, from 130 to 180° C. is preferred.

In the cooling tower 4, the first contacting liquid L1 is contacted to the exhaust gas G2.. In this embodiment, the first contacting liquid L1 is sprayed to the exhaust gas G2.. By the contact with the first contacting liquid L1, the exhaust gas G2 is cooled to have its temperature lowered and becomes an exhaust gas G3 after being cooled. At that time, a part of the exhaust gas G2 may be dissolved in the first contacting liquid L1. The first contacting liquid L1 contacted with the exhaust gas G2 will be pooled as a first treated liquid S1 at the bottom of the cooling tower 4.

The kind of the first contacting liquid L1 is not particularly limited, and it may be any one so long as it is capable of cooling the exhaust gas G2 by the contact with the exhaust gas G2. . One which dissolves a component in the exhaust gas G2 is preferred, and water (such as industrial water or distilled water) or an aqueous solution (the solute is one acceptable as a component in the granulation liquid) is preferred. In this embodiment, the first contacting liquid L1 at the initiation of the operation is water, and a liquid obtainable in the after-mentioned magnesium hydroxide-addition step will be reused as the first contacting liquid L1.

The temperature of the exhaust gas G3 after being cooled is preferably at most 80° C., more preferably at most 70° C. If G3 has a high temperature, an installation made of a material having a high heat resistance will be required. The lower limit of the temperature of the exhaust gas G3 after being cooled is preferably within a temperature range where components in the gas will not precipitate. For example, at least 40° C. is preferred, and at least 60° C. is more preferred.

Passing through a pipe line 5, the exhaust gas G3 after being cooled is supplied to a scrubber 6. As the scrubber 6, a known scrubber (an exhaust gas cleaning device) may be used. In this embodiment, a venturi scrubber is used.

In the scrubber 6, a second contacting liquid L2 is sprayed to the exhaust gas G3 after being cooled. By contacting the second contacting liquid L2 to the exhaust gas G3 after being cooled, a boron component in the exhaust gas G3 after being cooled will be dissolved in the second contacting liquid L2. At that time, components other than the boron component in the exhaust gas G3 after being cooled, may also be dissolved in the second contacting liquid L2.

For example, in a case where the exhaust gas G1 contains a sulfur component and/or a chlorine component, a sulfur component and/or a chlorine component in the exhaust gas G3 after being cooled, will be dissolved in the second contacting liquid L2.

The kind of the second contacting liquid L2 is not particularly limited, and one capable of dissolving at least a boron component in the exhaust gas G3 by the contact with the exhaust gas G3 and thus removing it from the gas, is used. Water (such as industrial water or distilled water) or an aqueous solution (the solute is one acceptable as a component in the granulation liquid) is preferred. In this embodiment, the second contacting liquid L2 at the initiation of the operation is water, and a liquid obtainable in the after-mentioned magnesium hydroxide-addition step will be reused as the second contacting liquid L2.

In this embodiment, immediately after the second contacting liquid L2 is sprayed to the exhaust gas G3 after being cooled, such a mixed fluid passes through a highly differential pressure site 7 to cause a pressure loss, whereby the mixed fluid becomes a turbulent flow state, and mixing of the exhaust gas G3 after being cooled and the second contacting liquid L2 will be carried out sufficiently and dissolution of components contained in the exhaust gas G3 after being cooled, in the second contacting liquid L2 will be further promoted.

The second contacting liquid L2 after the contact with the exhaust gas G3 after being cooled, will be pooled as the second treated liquid S2 at the bottom of the scrubber 6.

Thus, the boron component, etc. in the exhaust gas G3 after being cooled, are dissolved and removed in the treated liquid, and a clean gas G4 is obtainable.

As misty moisture is removed by a centrifugal dust collector 8, the clean gas G4 becomes an exhaust clean gas G5, which is discharged from a chimney 10 to the atmosphere. In this embodiment, between the centrifugal dust collector 8 and the chimney 10, a fan 9 is provided, so that the gas flow rate in the apparatus can thereby be adjusted from an inlet of the cooling tower 4 to an outlet of the chimney 10.

The misty moisture separated by the centrifugal dust collector 8 is pooled as a third treated liquid S3 at the bottom of the centrifugal dust collector 8.

The first treated liquid S1 is withdrawn from the bottom of the cooling tower 4 via a pipe line 11 and collected in a treated liquid tank 14.

The second treated liquid S2 is withdrawn from the bottom of the venturi scrubber 6 via a pipe line 12 and collected in a treated liquid tank 14.

The third treated liquid S3 is withdrawn from the bottom of the centrifugal dust collector 8 via a pipe line 13 and collected in a treated liquid tank 14.

<Magnesium Hydroxide-Addition Step>

The treated liquid tank 14 is provided with a pH measuring device 15 and a magnesium hydroxide-addition device 16. The first to third treated liquids S1 to S3 are mixed in the treated liquid tank 14 to form a treated liquid mixture. In the treated liquid mixture, at least the boron component in the exhaust gas G1 is dissolved. In the treated liquid tank 14, magnesium hydroxide is added to the treated liquid mixture, whereby a liquid containing a boron component and a magnesium component will be obtained.

It is considered that by the addition of magnesium hydroxide, the boron component in the treated liquid mixture will be reacted with the magnesium hydroxide to form magnesium borate. The liquid obtainable by the addition of magnesium hydroxide contains the formed magnesium borate and, in some cases, a non-reacted boron component and magnesium hydroxide, and in the present invention, this liquid is referred to as a liquid containing a boron component and a magnesium component. The liquid containing a boron component and a magnesium component is preferably an aqueous solution having such components dissolved. Here, there may be a case where a component in the liquid, such as magnesium borate, is not sufficiently dissolved due to a change in its concentration, the liquid temperature, the pH of the liquid, etc., and turbidity is formed to some extent by the addition of magnesium hydroxide to the treated liquid mixture. However, even the liquid in such a state that turbidity is formed, may be transported to the next step and may be used as a granulation liquid.

Further, in a case where molten glass from which an exhaust gas G1 has been recovered, is alkali-free borosilicate glass, there may be a case where a very small amount of chlorine, fluorine, calcium, etc. will be contained in the liquid obtainable by the addition of magnesium hydroxide. In a case where molten glass from which an exhaust gas G1 has been recovered, is not alkali-free borosilicate glass, as mentioned above, substances which are not raw materials for alkali-free borosilicate glass, are preliminarily removed in a step prior to the addition of magnesium hydroxide. For the removal of such substances, various known methods may be employed. However, it is not desirable that the proportion of the substances to be removed is large, whereby the scale of the apparatus has to be relatively large, and time and effort to be required will increase.

Further, magnesium hydroxide is hardly soluble in water, and therefore, it is preferred that in the magnesium hydroxide-addition device 16, a slurry having magnesium hydroxide dispersed in water (hereinafter sometimes referred to as an aqueous slurry of magnesium hydroxide) is prepared, and this slurry is added to the treated liquid mixture. The concentration of magnesium hydroxide in such an aqueous slurry of magnesium hydroxide may be constant, or may suitably be changed depending upon the water level in the treated liquid tank 14.

In order to prevent formation of a precipitate or turbidity due to non-reacted magnesium hydroxide in a liquid to which an aqueous slurry of magnesium hydroxide has been added, it is preferred to provide a stirring means such as a bubbler in the treated liquid tank 14 and to stir the liquid.

In the treated liquid tank 14, the amount of magnesium hydroxide to be added to the treated liquid mixture is preferably a sufficient amount to convert the boron component such as boric acid in the treated liquid mixture to its magnesium salt. Further, in a case where a sulfur component and/or a chlorine component or the like is contained in the treated liquid mixture, it is preferably a sufficient amount to convert such a component and the boron component to their magnesium salts.

On the other hand, if the amount of magnesium hydroxide to be supplied is too much, a precipitate of non-reacted magnesium hydroxide will be formed. If such a precipitate is formed too much, it becomes difficult to reuse such a liquid as the first contacting liquid L1 or the second contacting liquid L2, such being undesirable.

Accordingly, it is preferred to measure the pH of the liquid by the pH measuring device 15 in the treated liquid tank 14 and to control the amount of the aqueous slurry of magnesium hydroxide to be supplied so that the pH is maintained within a range of from 6.5 to 7.7. When the pH of the liquid is at least 6.5, the boron component, etc. in the treated liquid mixture can well be converted to their magnesium salts, and non-reacted boron component, etc. remaining in the liquid can be reduced.

On the other hand, in order to well prevent formation of a precipitate or turbidity due to magnesium hydroxide in the liquid, the pH of the liquid is maintained to be preferably at most 7.7, more preferably at most 7.5, particularly preferably at most 7.0.

The liquid thus obtained, is withdrawn from the treated liquid tank 14 and, as the case requires, conveyed and transported to a granulation liquid-preparation vessel 21 to prepare a granulation liquid. The withdrawal of the liquid from the treated liquid tank 14 may be conducted continuously or intermittently. The flow rate of the liquid to be withdrawn may be constant or may be suitably changed.

Further, in this embodiment, a part of the liquid is reused as the first contacting liquid L1 or the second contacting liquid L2. That is, a part of the liquid in the treated liquid tank 14 is, via a circulation pump 17, subjected to a temperature adjustment, as the case requires, and then, used as the first contacting liquid L1 to be sprayed in the cooling tank 4 or as the second contacting liquid L2 to be sprayed in the scrubber 6.

<Granulation Liquid-preparation Step>

In the granulation liquid-preparation vessel 21, the composition of the aqueous solution containing the boron component and the magnesium component is measured, and the composition is adjusted to be a desired granulation liquid composition to obtain a granulation liquid. Further, it is preferred to add water to adjust the concentration of the boron component and the magnesium component.

To the granulation liquid, known additives to be used for a granulation step may be incorporated. An example of such an additive may be an organic binder. As an example of the organic binder, polyvinyl alcohol may be mentioned. With a view to preventing coloration of glass, it is most preferred not to use an organic binder.

The granulation liquid prepared in the granulation liquid-preparation vessel 21 is suitably supplied to a granulation liquid tank 22 of the granulation device 1, and is used for the production of granules.

<Granulation Step (Step for Production of Granules)>

In the granulation device 1, a glass raw material powder for the production of alkali-free borosilicate glass is granulated in the presence of the granulation liquid to produce granules (granulation step). As the case requires, the granulation is followed by heating for drying.

The glass raw material powder is a powder of compounds which can be oxides as glass components, and may, for example, be the following silicon source, boron source, etc. Known raw material powders may suitably selected for use. In the granulation liquid, the boron component and the magnesium component are contained, and they become a part of the boron source and a part of the magnesium source.

The compositions of the granulation liquid and the glass raw material powder are designed so that a desired composition of granules is obtainable. The composition of granules is designed so that a desired glass composition of alkali-free borosilicate glass is obtainable.

Except for boron oxide, the composition of granules is the same composition as the glass composition to be obtained, as calculated as oxides. Boron oxide is usually blended so that the total of the boron source in the raw material powder and the boron component in the granulation liquid is, as calculated as oxide, larger by an amount corresponding to a volatile portion than the boron oxide content in the glass composition to be obtained.

Further, to the granules, as the case requires, a clarifier, a colorant, a melting assistant, an opacifier, etc. may be incorporated as auxiliary raw materials. As such auxiliary raw materials, known components may suitably be used.

Among them, a clarifier is likely to valatilize in the step of melting granules, and therefore, it may be recovered from a waste liquid and contained in a granulation liquid of the present invention. In such a case, the granulation liquid may be used also as a clarifier raw material.

[Silicon Source]

A raw material powder as the silicon source is a powder of a compound which can become a $SiO_2$ component in the step of producing glass. As the silicon source, silica sand is preferably used.

[Boron Source]

A raw material powder as the boron source is a powder of a compound which can become a $B_2O_3$ component in the step of producing glass. As specific examples, boric acid such as orthoboric acid ($H_3BO_3$), metaboric acid ($HBO_2$) or tetraboric acid ($H_2B_4O_7$); boron oxide ($B_2O_3$); colemanite (calcium borate); etc. may be mentioned. One of them may be used alone, or two or more of them may be used in combination. Orthoboric acid is preferred, since it is inexpensive and readily available. Further, colemanite is also the after-mentioned calcium source.

[Magnesium Source]

A raw material powder as the magnesium source is a powder of a compound which can become a MgO component in the step of producing glass. As specific examples, magnesium oxide (MgO), magnesium hydroxide ($Mg(OH)_2$) and magnesium carbonate ($MgCO_3$) may be mentioned.

[Aluminum Source]

A raw material powder as the aluminum source is a powder of a compound which can become an $Al_2O_3$ component in the step of producing glass. Aluminum oxide, aluminum hydroxide, etc. are preferably used. One of them may be used alone, or two or more of them may be used in combination.

[Alkaline Earth Metal Source]

A raw material powder as the alkaline earth metal source is a powder of a compound which can become SrO, CaO or BaO in the step of producing glass. Specific examples may be carbonates such as calcium carbonate ($CaCO_3$), barium carbonate ($BaCO_3$), strontium carbonate ($SrCO_3$), dolomite (ideal chemical composition: $CaMg(CO_3)_2$), etc., oxides such as calcium oxide (CaO), barium oxide (BaO), strontium oxide (SrO), etc., and hydroxides such as calcium hydroxide ($Ca(OH)_2$), barium hydroxide ($Ba(OH)_2$), strontium hydroxide ($Sr(OH)_2$), etc. One of them may be used alone, or two or more of them may be used in combination.

[Clarifier]

As the clarifier, a sulfate, chloride or fluoride may, for example, be contained in granules. One of them may be used alone, or two or more of them may be used in combination.

As the sulfate, chloride or fluoride, it is possible to use a compound containing a cation of an oxide constituting glass. Specifically it is possible to use a sulfate, chloride or fluoride of Mg or an alkaline earth metal. In its use, a sulfate, chloride or fluoride of Mg is deemed to be a magnesium source. A sulfate, chloride or fluoride of an alkaline earth metal is deemed to be an alkaline earth metal source.

In a case where a sulfate and/or a chloride is used as a clarifier, $MgSO_3$ and/or $MgCl_2$ will be contained in the liquid obtainable in the above-mentioned magnesium hydroxide-addition step. By using such a waste liquid as a granulation liquid, it is possible to recover and reuse a sulfur component and a chlorine component derived from the sulfate and/or the chloride. $MgSO_3$ and/or $MgCl_2$ in the granulation liquid will be a magnesium source and will also be a sulfate and/or a chloride as a clarifier.

[Granulation Method]

The granulation step can be conducted by suitably using a known granulation method. For example, a dry granulation method such as a tumbling granulation method or a wet granulation method such as a spray drying granulation method may suitably employed. For example, a tumbling granulation method is preferred from such a viewpoint that granules having a relatively large particle size as suitably used in a usual melting method, can thereby easily be produced, and a spray drying granulation method is preferred from such a viewpoint that granules having a relatively small particle size as suitably used in an in-flight melting method, can thereby easily be produced. As the granulation device, a known one may suitably be used.

[Tumbling Granulation Method]

As a tumbling granulation method, preferred is, for example, a method wherein a glass raw material powder is put into a container of a tumbling granulation apparatus, and the interior of the container is subjected to vibration and/or rotation so that while mixing, tumbling and stirring the raw material powder, a predetermined amount of the granulation liquid is sprayed to the raw material powder to carry out granulation.

As the container of the tumbling granulation apparatus, a rotational container of a dish-form, cylindrical-form or conical-form, or a vibration type container may, for example, be used without any particular restriction.

The tumbling granulation apparatus is not particularly limited. For example, it is possible to use one comprising a container rotational with its rotational axis in a direction inclined to the vertical direction, and rotary vanes rotational in the container about the rotational axis in a direction opposite to the container. Specifically, such a tumbling granulation apparatus may, for example, be Eirich Intensive Mixer (trade name, manufactured by Eirich).

If the amount of the granulation liquid to be used is too large, a long time is required for drying, and if it is too small, the strength of granules tends to be inadequate. Therefore, it is desired to set the amount not to cause such drawbacks. For example, it is preferred to carry out the granulation by supplying the granulation liquid in an amount of from 10 to 20 parts by mass per 100 parts by mass of the total amount of the glass raw material powder.

The particle size of granules can be controlled by the stirring intensity and the stirring time.

After the granulation by the tumbling granulation apparatus, the obtained particles are preferably heated and dried. A known heating and drying method may be used for this purpose. For example, it is possible to employ a method of heating the particles at a temperature of from 100° C. to 120° C. for from 6 hours to 12 hours, by means of a hot air drier.

[Spray Drying Granulation Method]

A spray drying granulation method may be carried out by a known method. For example, by means of a stirring apparatus such as a ball mill, the granulation liquid is supplied to a raw material powder to prepare a slurry, and the slurry is sprayed e.g. into a high temperature atmosphere at a level of from 200 to 500° C. by means of a spraying means such as a spray drier for drying and solidifying it to obtain granules. The spray drying granulation method is preferred to obtain relatively small granules having an average particle size (D50) at a level of e.g. from 0 to 700 μm. The obtained granules may be sieved, as the case requires.

[Particle Size of Granules]

The average particle size (D50) of the granules is not particularly limited, and it is preferably made to be a suitable size depending upon the method for producing molten glass by using the granules. Variation in the particle size of granules should better be small in order to improve uniformity of the glass composition in molten glass or in a glass product. The average particle size and the particle size distribution of the granules can be adjusted by the composition of the raw material powder or by the production conditions in the granulation step.

In a case where the granules are to be used in a method for melting them by a usual melting method, the average particle size (D50) of the granules is preferably at least 1.0 mm, whereby it is readily possible to suppress formation of bubbles in molten glass.

Here, in the present invention, "D50" representing the average particle size of particles is a cumulative volume 50% median diameter in a particle size distribution curve measured by means of a laser diffraction scattering method in the case of particles being less than 1 mm, or a cumulative mass 50% median diameter measured by using e.g. a sieve in the case of particles being at least 1 mm.

Whereas, in a case where the granules are to be melted by an in-flight melting method, the average particle size (D50) of the granules is preferably from 50 to 1,000 μm, more preferably from 50 to 800 μm, further preferably from 70 to 700 μm. When the average particle size of the granules is at least 50 μm, scattering or the like of the granules or their molten particles into a flue is less likely to occur during the in-flight melting. Further, since the surface area per unit mass becomes relatively small, volatilization of boric acid from the surface of the molten glass particles can be reduced, such being desirable. On the other hand, when the average particle size of the granules is at most 1,000 μm, at the time of melting the granules in an in-flight heating apparatus, vitrification sufficiently proceeds even into the interior of particles to form molten glass particles, such being desirable.

[In the Case of Glass Containing Alkaline Earth Metal Oxide]

As mentioned above, when an alkaline earth metal borate hydrate is formed at the time of the production of granules, the strength of the granules is improved. However, if a reactive magnesium compound is present as the magnesium source, formation of the alkaline earth metal borate hydrate is likely to be suppressed. In the present invention, the magnesium component in the granulation liquid becomes the magnesium source, and accordingly, up to the corresponding amount, it is possible to reduce the blend amount of a reactive magnesium compound (a compound selected from the group consisting of magnesium oxide, magnesium hydroxide and magnesium carbonate).

That is, according to a finding by the present inventors, when an alkaline earth metal borate hydrate is formed in the step of producing granules, the strength of the granules is improved. Such an effect is particularly high in a case where a borate hydrate of Sr and/or a borate hydrate of Ca is formed.

It is preferred to use a carbonate (including dolomite) as the alkaline earth metal source from such a viewpoint that the alkaline earth metal borate hydrate is thereby readily formed. On the other hand, if an alkaline earth metal hydroxide is present in the raw material powder, the alkaline earth metal borate hydrate tends to be hardly formed.

Further, if a magnesium source selected from the group consisting of magnesium oxide (MgO), magnesium hydroxide ($Mg(OH)_2$) and magnesium carbonate ($MgCO_3$) is contained in the raw material powder, the alkaline earth metal borate hydrate tends to be hardly formed in the step of producing granules.

When the strength of granules is improved, formation of a fine powder due to breakage of the granules in use, is suppressed and uniformity of the glass composition is also improved. Further, it is possible to use silica sand having a small size, which used to be difficult to use as a glass raw material. When the particle size of silica sand in the granules is small, it is possible to more readily improve the uniformity of the composition in molten glass or in a glass product.

Further, according to a finding by the present inventors, when magnesium ions are present in the slurry containing the raw material powder and the granulation liquid in a wet granulation method, the strength of granules to be obtained tends to be readily improved. The magnesium ions are considered to function as a binder.

As the magnesium component is contained in the granulation liquid in the present invention, it is possible to improve the strength of granules by preparing the above slurry by using such a granulation liquid.

<Method for Producing Glass Product>

The method for producing a glass product of the present invention is a method which comprises forming the molten glass obtained in the method for producing molten glass of the present invention, followed by annealing. Here, a glass product is meant for a product wherein glass which is solid and has substantially no fluidity at room temperature, is used as a part or whole thereof, and it includes, for example, one obtained by processing a glass surface.

Figure 2:
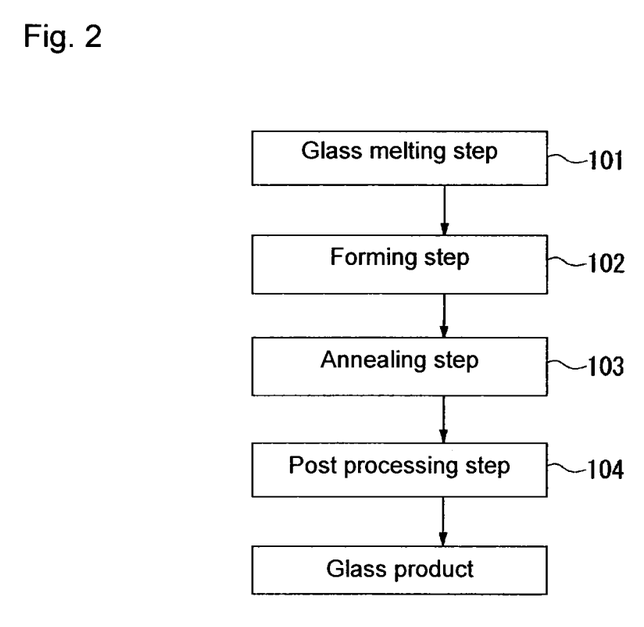
FIG. 2 is a flow chart illustrating an example of the method for producing a glass product of the present invention.

FIG. 2 is a flow chart illustrating an example of the method for producing a glass product of the present invention. Reference symbol 101 represents a glass melting step, which corresponds to a step of melting granules in the method for producing molten glass of the present invention.

Firstly, the molten glass obtained in the glass melting step 101 is formed into a desired shape in a forming step 102, and then annealed in an annealing step 103. Thereafter, as the case requires, post processing such as cutting or polishing is applied by a known method in a post processing step 104 to obtain a glass product.

The forming step 102 can be carried out by a known method such as a float process, a downdraw process or a fusion process. The float process is a process wherein molten glass is formed into a plate-form on molten tin.

The granules in the present invention are suitable particularly for a float process, since MgO is contained in the glass composition.

The annealing step 103 can also be carried out by a known method.

EXAMPLES

Now, the present invention will be described in further detail with reference to Examples, but it should be understood that the present invention is by no means limited to these Examples.

In the following, the unit "$Nm^3$ (normal cubic meter)" for an amount of gas means a gas volume of 1 $m^3$ in a case where an objective gas is calculated under standard conditions (0° C., 760 mmHg).

The following methods were employed as methods for measuring the respective components.

As a method for measuring the concentration of sulfur oxide ($SO_x$) in the gas, the ion chromatograph method disclosed in JIS K0103 was employed.

As a method for measuring the concentration of hydrogen chloride (HCl) in the gas, the ion chromatograph method disclosed in JIS K0107 was employed.

The concentration of boron (B) was measured by means of an ICP emission spectrometry by passing the gas through water.

As a method for measuring the concentration of fluorine (F) in the gas, the lanthanum-alizarin complexone absorption photometry disclosed in JIS K0105 was employed.

The concentrations of sulfur (S), chlorine (Cl), boron (B) and fluorine (F) in the liquid were measured by means of an ICP emission spectrometry.

Example 1

Using an apparatus having the construction as shown in FIG. 1, molten glass having the following glass composition was produced under the following conditions. However, the glass raw material put into the melting furnace was not granules produced by the granulation device, and a raw material powder separately prepared so that the desired glass composition was obtainable, was used. The concentrations of the respective components (exhaust gas composition) in the exhaust gas G2 immediately before being supplied to the cooling tower 4 were as shown in Table 1.

In this Example, no calcium hydroxide-supplying means 18 was provided before the bag filter 3.

[Glass Composition (Represented by Mol % Based on Oxides)]

$SiO_2$: 66.0%, $Al_2O_3$: 11.4%, $B_2O_3$: 7.7%, MgO: 5.3%, CaO: 4.5% and SrO: 5.1%

[Production Conditions]

Amount of exhaust gas G1 generated from the melting furnace: about 500 $Nm^3$/h.

Temperature of exhaust gas G2 immediately before being supplied to the cooling tower 4: 170° C.

Amount of first contacting liquid L1 sprayed in the cooling tower 4: 1.3 m³/h.

Temperature of exhaust gas G3 after being cooled: 65° C.

Temperature of second contacting liquid L2 immediately before being sprayed in the venturi scrubber 6: 65° C.

Amount of second contacting liquid L2 sprayed in the venturi scrubber 6: 4.4 m³/h.

Temperature of clean gas G4 at the outlet of the venturi scrubber 6: 65° C.

Initially in such a state that water was put in the treated liquid tank 14, continuous operation was started under the above production conditions. The change in pH of the liquid in the treated liquid tank 14 after magnesium hydroxide was added, was set to be within the range shown in Table 1. After conducting a preliminary operation for 6 days, the liquid in the treated liquid tank 14 was continuously withdrawn at a flow rate of 12.5 L/h.

After 10 days (including the preliminary operation for 6 days) from the start of the operation, with respect to the liquid withdrawn from the treated liquid tank 14 and the exhaust clean gas G5 at the outlet of the centrifugal dust collector 8, the concentrations of the respective components (the liquid composition and the exhaust gas composition) shown in Table 1 were measured. Further, after 20 days from the start of the operation, the operation was stopped, and the state of the liquid (the presence or absence of a precipitate or turbidity) was visually observed and evaluated by the following standards. The results are shown in Table 1.

Otherwise, measurements and evaluations with respect to the respective items in Table 1 were carried out in the same manner as in Example 1. The results are shown in Table 1.

Examples 3 to 5

Measurements and evaluations with respect to the respective items in Table 1 were carried out in the same manner as in Example 1 except that the pH change range of the liquid in the treated liquid tank 14 was changed as shown in Table 1. The results are shown in Table 1.

Further, in Example 5, a precipitate and turbidity of the liquid in the treated liquid tank 14 were substantial, and therefore, the liquid was subjected to solid-liquid separation to obtain a liquid which was reused as a contacting liquid.

Example 6

This Example is an Example wherein a fluorine component derived from a clarifier was present in exhaust gas G1. In this Example, no calcium hydroxide-supplying means 18 was provided before the bag filter 3.

The concentrations of the respective components (exhaust gas composition) in exhaust gas G2 immediately before being supplied to the cooling tower 4, are shown in Table 1.

Otherwise, measurements and evaluations with respect to the respective items in Table 1 were carried out in the same manner as in Example 1. The results are shown in Table 1.

TABLE 1

|  |  |  | Ex. 1 | Ex. 2 | Ex. 3 | Ex. 4 | Ex. 5 | Ex. 6 |
|---|---|---|---|---|---|---|---|---|
| pH of liquid | | — | 6.5-7.0 | 6.5-7.0 | 7.0-7.5 | 7.5-7.7 | At least 8.0 | 6.5-7.0 |
| State of liquid | | — | ◎ | ◎ | ○ | Δ | X | Δ |
| Composition of exhaust gas G2 | $SO_x$ | vol ppm | 59 | 98 | | 59 | | |
| | HCl | mg/Nm³ | 124 | 620 | | 124 | | |
| | B | mg/Nm³ | 348 | 580 | | 348 | | |
| | F | mg/Nm³ | | | 0 | | | 72 |
| Composition of exhaust gas G5 | $SO_x$ | vol ppm | 0.2 | 0.3 | 0.2 | 0.2 | 0.2 | 0.3 |
| | HCl | mg/Nm³ | 2.0 | 4.0 | 1.0 | 1.0 | 1.0 | 3.0 |
| | B | mg/Nm³ | 1.0 | 3.0 | 0.5 | 0.5 | 0.5 | 2.0 |
| | F | mg/Nm³ | | | 0 | | | 0.1 |
| Composition of liquid | S | mol/L | 0.11 | 0.18 | 0.10 | 0.11 | 0.11 | 0.11 |
| | Cl | mol/L | 0.14 | 0.68 | 0.14 | 0.14 | 0.14 | 0.13 |
| | B | mol/L | 1.29 | 2.15 | 1.30 | 1.34 | 1.33 | 1.25 |
| | F | mol/L | | | 0 | | | 0.15 |

[State of Liquid in Treated Liquid Tank 14]

◎ (excellent): No precipitate or turbidity is observed, and the liquid can be reused as a contacting liquid.

○ (good): Turbidity is observed, but a precipitate is little, and the liquid can be reused as a contacting liquid.

Δ (acceptable): A precipitate is observed at a site where there is no flow, and if the liquid is stirred by providing a bubbler at the site where there is no flow, the stirred liquid can be reused as a contacting liquid.

X (unacceptable): Turbidity or a precipitate is substantial, and it is difficult to reuse the liquid as a contacting liquid.

Example 2

In this Example, an exhaust gas was used in which the contents of the respective components in exhaust gas G2 were larger than in Example 1. The concentrations of the respective components in exhaust gas G2 immediately before being supplied to the cooling tower 4 in this Example, are shown in Table 1.

As shown by the results in Table 1, in each of Examples 1 to 6, boron (B), sulfur (S) and chlorine (Cl) contained in the exhaust gas can be highly removed, and the liquid can be recovered in the form of an aqueous solution which can be used as a part of the granulation liquid.

Further, magnesium hydroxide to be added as a neutralizing agent is hardly soluble in water, and it is evident that in a case where the liquid is to be reused for recycling as a contacting liquid, the pH of the liquid in the treated liquid tank 14 is controlled preferably within a range of from 6.5 to 7.7, particularly preferably within a range of from 6.5 to 7.5 whereby turbidity or precipitation in the liquid can better be suppressed.

When a treated liquid containing a sulfur component, a chlorine component, a boron component and a fluorine component, is neutralized by magnesium hydroxide, the sulfur component will react with magnesium hydroxide to form $MgSO_4$, the chlorine component will react with magnesium hydroxide to form $MgCl_2$, and the fluorine component will react with magnesium hydroxide to form $MgF_2$. The sulfur component, the chlorine component and the boron component will form salts which are readily soluble in water, but the solubility of magnesium borate is not so high as magnesium sulfate or magnesium chloride, and therefore, when the liquid temperature is lowered, crystals may sometimes precipitate. When the liquid in Example 2 was cooled to 35° C., and when the liquid in Example 1 was cooled to 25° C., crystals of $MgB_6H_{10} \cdot 7H_2O$ precipitated. Accordingly, it is desirable to maintain the liquid temperature to be at least 35° C. in order not to let a precipitate form. On the other hand, magnesium fluoride is scarcely soluble in water. Therefore, the liquid in Example 6 was turbid. In a case where this liquid is to be used, it is necessary to stir the liquid by means of a bubbler or a stirrer not to let the liquid to stand still.

Production Example 1

Production of Granules and Production of Glass

Using a mixture of the liquid recovered in Example 1 and water, as a granulation liquid, granules were produced, and using such granules, glass having the same glass composition as the molten glass in Example 1 was produced.

Raw material powders for the production of alkali-free borosilicate glass were mixed in the proportions (unit: mass %) shown in Table 2, and to 100 parts by mass of such a mixed powder, 16.7 parts by mass of the liquid recovered in Example 1 and 2.7 parts by mass of water were added, and using Eirich Intensive Mixer (trade name, manufactured by Nippon Eirich Co., Ltd), granules having a cumulative mass % average particle size (D50) of about 2 mm were obtained. Using the obtained granules, glass was produced. That is, the granules in such an amount that the mass after vitrification would be 250 g, were put in a platinum crucible having a diameter of about 80 mm and heated for 60 minutes by an electric furnace of 1,550° C. to melt the glass raw materials. Then, the glass was annealed.

Comparative Production Example 1

Production of Mixed Powder and Production of Glass

Raw material powders were mixed in the proportions (unit: mass %) shown in Table 2 so that the composition after vitrification would be the same as in Production Example 1, to obtain a mixed powder. Glass was produced in the same manner as in Production Example 1 except that instead of the granules in Production Example 1, the mixed powder was used.

TABLE 2

|  | Ex. 1 | Comp. Ex. 1 |
| --- | --- | --- |
| Silica sand | 51.5% | 50.3% |
| Alumina | 14.9% | 14.6% |
| Boric acid | 11.4% | 12.4% |
| Dolomite | 9.5% | 9.3% |
| Magnesium hydroxide | 0.2% | 0.5% |
| Strontium carbonate | 9.5% | 9.3% |
| Calcium carbonate | 0.4% | 0.4% |
| Magnesium chloride hexahydrate | 2.2% | 2.4% |
| Magnesium sulfate heptahydrate | 2.3% | 0.7% |

<Evaluation of Glass>

With respect to glass obtained in each of Production Example 1 and Comparative Production Example 1, evaluation was made by the following method.

That is, the glass at the upper center of the crucible was hollowed out by a core drill to obtain a cylindrical glass having a diameter of 40 mm and a height of 25 mm. A glass plate having a thickness of 1 mm including the center axis of the cylindrical glass was cut out. Both cut-out surfaces were subjected to optical polishing (mirror polishing finish) to obtain a sample for evaluation. With respect to the sample for evaluation, the number of remaining bubbles and $\Delta SiO_2$ value serving as an index for uniformity of the glass composition were measured by the following methods. Further, by a fluorescent X-ray method, for each case, it was confirmed that glass having the desired composition was obtained.

(Method for Measuring the Number of Remaining Bubbles)

With respect to a region corresponding to from 1 to 10 mm from the upper surface of glass in the crucible, the cut-out surface was observed by a stereoscopic microscope, and the number of bubbles having a diameter of at least 50 μm was counted. The obtained value was divided by the mass (g) of the sample for evaluation to obtain the number of remaining bubbles.

(Method for Measuring $\Delta SiO_2$ Value)

Of the sample for evaluation, with respect to a region corresponding to from 0 to 3 mm from the upper surface of glass in the crucible, the $SiO_2$ concentration (unit: mass %) was measured by a fluorescent X-ray analysis. The measured value was represented by X1. With respect to a region corresponding to from 22 to 25 mm from the upper surface of glass in the crucible, in the same manner, the $SiO_2$ concentration (unit: mass %) was measured. The measured value was represented by X2. A value obtained by subtracting X2 from X1 (i.e. X1-X2) was taken as $\Delta SiO_2$ value.

As a result of the measurements, in Production Example 1, the number of remaining bubbles was 103, and $\Delta SiO_2$ value was 1.5.

In Comparative Production Example 1, the number of remaining bubbles was 124, and $\Delta SiO_2$ value was 3.3.

Production Example 1 employing the granules granulated by using the liquid recovered in Example 1 is superior in uniformity of the glass composition as compared to Comparative Production Example employing the raw material powder without granulation.

INDUSTRIAL APPLICABILITY

Granules obtainable by the present invention are useful for the production of alkali-free borosilicate glass. Further, the granules can be produced by recovering a boron component from an exhaust gas discharged in the process for the production of alkali-free borosilicate glass, whereby reuse of the boron component can easily be accomplished.

This application is a continuation of PCT Application No. PCT/JP2012/063983, filed on May 30, 2012, which is based upon and claims the benefit of priority from Japanese Patent Application No. 2011-117148 filed on May 25, 2011. The contents of those applications are incorporated herein by reference in its entirety.

REFERENCE SYMBOLS

1: Granulation device
2: Melting furnace
3: Bag filter
4: Cooling tower 5, 11, 12, 13: Pipe lines
6: Scrubber (exhaust gas cleaning device)
7: Highly differential pressure site
8: Centrifugal dust collector
9: Fan
10: Chimney
14: Treated liquid tank
15: pH-measuring device
16: Magnesium hydroxide-addition device
17: Circulation pump
18: Calcium hydroxide-supplying means
21: Granulation liquid-preparation vessel
22: Granulation liquid tank
G1, G2. : Exhaust gases
G3: Exhaust gas after being cooled
G4: Clean gas
G5: Exhaust clean gas
L1: First contacting liquid
L2: Second contacting liquid
S1: First treated liquid
S2: Second treated liquid
S3: Third treated liquid
101: Glass melting step (Step for melting granules)
102: Forming step
103: Annealing step
104: Post processing step

What is claimed is:

1. A process for producing granules, which comprises:
contacting a contacting liquid and an exhaust gas formed in a process for producing borosilicate glass by melting a glass raw material, to obtain a treated liquid having a boron component in the exhaust gas dissolved in the contacting liquid,
adding magnesium hydroxide to the treated liquid to obtain a liquid comprising the boron component and the magnesium component,
measuring a composition of the liquid comprising the boron component and the magnesium component and adjusting the composition of the liquid comprising the boron component and the magnesium component to prepare a granulation liquid, and
granulating a glass raw material powder for producing alkali-free borosilicate glass in the presence of the granulation liquid.

2. The process for producing granules according to claim 1, wherein the borosilicate glass is alkali-free borosilicate glass.

3. The process for producing granules according to claim 1, wherein the alkali-free borosilicate glass comprises at least $SiO_2$, $B_2O_3$ and MgO, and as represented by mol % based on oxides, the content of $SiO_2$ is from 60 to 75 mol %, the content of $B_2O_3$ is from 2 to 25 mol %, and the content of MgO is from 1 to 30 mol %.

4. The process for producing granules according to claim 1, wherein the granules are produced by adjusting the glass raw material powder and the granulation liquid so that glass obtainable by melting and vitrifying the granules would be alkali-free borosilicate glass having the glass composition which comprises at least $SiO_2$, $B_2O_3$ and MgO, wherein as represented by mol % based on oxides, the content of $SiO_2$ is from 60 to 75 mol %, the content of $B_2O_3$ is from 2 to 25 mol %, and the content of MgO is from 1 to 30 mol %.

5. The process for producing granules according to claim 1, wherein a part of the liquid comprising the boron component and the magnesium component is reused as the contacting liquid.

6. The process for producing granules according to claim 1, wherein the magnesium hydroxide is added to the treated liquid so that the pH of the liquid comprising the boron component and the magnesium component is 6.5 to 7.7.

7. The process for producing granules according to claim 1, wherein the liquid comprising the boron component and the magnesium component is stirred after the addition of the magnesium hydroxide to the treated liquid.

8. The process for producing granules according to claim 1, wherein before contacting the exhaust gas with the contacting liquid, the exhaust gas is treated by a dust collector.

9. The process for producing granules according to claim 8, wherein before the dust collector, calcium hydroxide is supplied to the exhaust gas.

10. A method for producing molten glass, which comprises:
contacting a contacting liquid and an exhaust gas formed in a process for producing borosilicate glass by melting a glass raw material, to obtain a treated liquid having a boron component in the exhaust gas dissolved in the contacting liquid,
adding magnesium hydroxide to the treated liquid to obtain a liquid comprising the boron component and the magnesium component,
measuring a composition of the liquid comprising the boron component and the magnesium component and adjusting the composition of the liquid comprising the boron component and the magnesium component to prepare a granulation liquid,
granulating a glass raw material powder for producing alkali-free borosilicate glass in the presence of the granulation liquid to produce granules, and melting the granules to obtain molten glass.

11. The method for producing molten glass according to claim 10, wherein an exhaust gas formed by melting of the granules is used as the exhaust gas.

12. The method for producing molten glass according to claim 10, wherein the granules are put onto a molten glass liquid surface in the melting furnace and melted.

13. The method for producing molten glass according to claim 10, wherein at least a part of the granules is melted in a gas phase atmosphere to form molten glass particles, and the molten glass particles are collected to obtain molten glass.

14. A method for producing a glass product, which comprises:
contacting a contacting liquid and an exhaust gas formed in a process for producing borosilicate glass by melting a glass raw material, to obtain a treated liquid having a boron component in the exhaust gas dissolved in the contacting liquid,
adding magnesium hydroxide to the treated liquid to obtain a liquid comprising the boron component and the magnesium component,
measuring a composition of the liquid comprising the boron component and the magnesium component and adjusting the composition of the liquid comprising the boron component and the magnesium component to prepare a granulation liquid,
granulating a glass raw material powder for producing alkali-free borosilicate glass in the presence of the granulation liquid to produce granules,
melting the granules to obtain molten glass, and
annealing the molten glass.

15. The method for producing a glass product according to claim 14, wherein the molten glass is formed into a plate-form by a float process.

* * * * *